(12) United States Patent
Emmerich

(10) Patent No.: US 6,325,440 B1
(45) Date of Patent: Dec. 4, 2001

(54) INSTRUMENT PANEL CARRIER ARRANGEMENT IN THE BODY OF A MOTOR VEHICLE AND INSTRUMENT PANEL CARRIER

(75) Inventor: Richard Emmerich, Osloss (DE)

(73) Assignee: Volkswagen AG, Wolfburg (DE)

( * ) Notice: Subject to any disclaimer, the term of this patent is extended or adjusted under 35 U.S.C. 154(b) by 0 days.

(21) Appl. No.: 09/743,309

(22) PCT Filed: Jun. 24, 1999

(86) PCT No.: PCT/EP99/04398

§ 371 Date: Apr. 10, 2001

§ 102(e) Date: Apr. 10, 2001

(87) PCT Pub. No.: WO00/02763

PCT Pub. Date: Jan. 20, 2000

(30) Foreign Application Priority Data

Jul. 7, 1998 (DE) .............................................. 198 30 303

(51) Int. Cl.⁷ .................................................. B62D 25/14
(52) U.S. Cl. .................................. 296/70; 296/72; 180/90
(58) Field of Search ....................... 296/70, 72; 280/779; 180/90

(56) References Cited

U.S. PATENT DOCUMENTS

| | | | | |
|---|---|---|---|---|
| 5,282,637 | * | 2/1994 | McCreadie | 280/779 X |
| 5,549,344 | * | 8/1996 | Nishijima et al. | 296/70 |
| 5,678,877 | * | 10/1997 | Nishijima et al. | 296/70 |
| 5,806,919 | * | 9/1998 | Sinner et al. | 296/72 X |
| 5,931,520 | * | 8/1999 | Seksaria et al. | 296/70 |
| 5,979,965 | * | 11/1999 | Nishijima et al. | 296/70 |
| 6,176,544 | * | 1/2001 | Seksaria et al. | 296/72 X |

FOREIGN PATENT DOCUMENTS

| | | |
|---|---|---|
| 195 27 627 | 1/1997 | (DE) . |
| 197 12 902 | 1/1997 | (DE) . |
| 197 14 631 | 10/1997 | (DE) . |
| 198 08 615 | 8/1998 | (DE) . |
| 198 43 211 | 3/1999 | (DE) . |
| 0 755 849 | 1/1997 | (EP) . |
| 08119001 | 5/1996 | (JP) . |

* cited by examiner

Primary Examiner—Stephen T. Gordon
Assistant Examiner—Patricia Engle
(74) Attorney, Agent, or Firm—Kenyon & Kenyon

(57) ABSTRACT

An arrangement of a dash panel in a vehicle body includes the dash panel being fixed at its ends to opposite A-pillars of the vehicle body. The dash panel defines a transverse support at the height of the dashboard, and vehicle parts are disposed in front of a middle area of the dash panel. During a head-on collision, the vehicle parts are blocked against the dash panel as a result of energy-absorbing deformations of the front part of the vehicle. The dash panel includes side areas aligned in a rectilinear arrangement between the A-pillars and a middle area bent toward the passenger compartment. This arrangement provides a larger displacement path for the vehicle parts located in front of the middle area without reducing the space and distance of the front seats in the side areas. The middle area may include a triangular cross-section having a wedge-shaped edge pointing towards the front of the vehicle, the wedge-shaped edge defining a separation and cutting edge.

11 Claims, 2 Drawing Sheets

INSTRUMENT PANEL CARRIER ARRANGEMENT IN THE BODY OF A MOTOR VEHICLE AND INSTRUMENT PANEL CARRIER

FIELD OF THE INVENTION

The present invention relates to an arrangement of a dash panel in a vehicle body and a dash panel.

BACKGROUND INFORMATION

Conventional dash panels are designed as traverses that extend approximately in a straight line between laterally opposed A-pillars, to which they are attached by their ends. Such dash panels are located approximately at the height of the dashboard, i.e., in a space underneath the window railing of the front wind shield, so that, when viewed from the front side of the vehicle, additional vehicle parts are mounted in front of the dash panel. Conventional vehicle bodies particularly include a relatively large-volume air-conditioning/heating unit, which is mounted in the middle area in front of the dash panel, and has a sturdy design.

In the case of a head-on collision, the front end containing the support structure for absorbing impact energy is deformed and shortened. The dash panel connected to the A-pillars is a component of a passenger compartment, which should be as dimensionally stable as possible, and should not be deformed in response to a head-on collision. Vehicle parts, in particular an air-conditioning/heating unit, which are disposed in front of the dash panel (as seen from the front side of the vehicle), are displaced against the dash in response to a head-on collision along with a deformation of the front end. In this case, the dash panel acts as a barrier, so that these parts, especially heating-unit parts, come to rest in front of the dash panel. This shortens deformation paths for a selective, energy-absorbing deformation. In addition, the deceleration in coming to rest increases in an undesirably sharp manner. Furthermore, predetermined deformation occurrences, e.g. flexural buckling, can be impaired.

A vehicle body including a traverse, which has a triangular cross-section and is located at the front end of the passenger compartment, is described, for example, in German Published Patent Application No. is 197 14 631). This traverse forms the lower frame member of the windshield, so that no vehicle parts, which are in the above-mentioned danger of being brought to rest against an obstacle in response to a head-on collision, can be mounted in front of such a traverse. In this case, the triangular cross-section of the traverse is obviously chosen for its small space requirement, and beyond that, has neither an explicit, nor a recognizable function.

An arrangement of a dash panel in a vehicle body having laterally opposite A-pillars is described in European Published Application No. 0 755 849. The dash panel is attached by its ends to the A-pillars as a traverse at the level of the dashboard. In addition, the arrangement includes vehicle parts, in particular an air-conditioning/heating unit, which are mounted in a middle area in front of the dash panel, as seen from the front side of the vehicle. The vehicle parts may be displaced against the dash panel by the energy-absorbing deformations of the front end in response to a front-end collision. In the two side areas, the dash panel extends approximately in a straight line in alignment between the A-pillars. In the middle area, the dash panel is bent back at angles into the passenger compartment.

The dash panel may also be in the form of a ladder frame or truss frame and may include a dimensionally stable rear traverse that connects the A-pillars, a front traverse fixed to the inner side of the front wall and a plurality of braces connecting the two traverses. The section bent at angles may provide a longer path along which vehicle parts mounted in front of it can move, before such vehicle parts come to rest against the dash panel in response to a front-end collision. Thus, impact energy can be purposefully absorbed in the front end, over long deformation paths, without premature block formation. However, because of the restricted installation space, the middle mounting area, which is in front of the dash panel, and is enlarged by the section bent at angles, is regularly used for interior components located directly behind it. Thus, in the case of a front-end collision, an increased displacement path is not available, and in a front-end collision, such installation parts come to rest in front of the dash panel, which results in the deformation paths for a selective, energy-absorbing deformation being shortened. When such block formation occurs, the deceleration also increases in an undesirably sharp manner. Furthermore, predetermined deformation modes, such as accordion-like buckling, can also be impaired.

In addition, German Published Patent Application No. 198 43 211 describes a steering-support-member design for motor vehicles, which is for mounting a steering column on a steering-support member and which is fastened on both sides to the vehicle body using a support that has a flange-like design. A middle section of the steering-support member is approximately in the shape of a trapezoid, a stiffening element being fixed in the direction transverse to the bent section. This design is intended to increase the stiffness of the steering-support member so that its base cannot vibrate. The supports for the steering-support member are provided with bore holes for screws, which are simultaneously screwed into the A-pillar sections on both sides of the vehicle body, so that the steering-support member is mounted via the supports.

One object of the present invention is to provide an arrangement of a dash panel in a vehicle body so that, in response to a front-end collision, favorable deformation conditions are created for absorbing impact energy without block formation. It is a further object of the present invention consists in a dash panel.

SUMMARY

The above and other beneficial objects of the present invention are most effectively attained by providing a dash panel having a wedge profile, and more particularly, a triangular profile. In this arrangement, the edge of the wedge is pointed forward in the direction of travel, as a transversely running, cutting and separating edge.

This cutting and separating edged may dismantle vehicle parts, particularly the air-conditioning/heating unit, in response to a front-end collision and a movement of the vehicle parts against the dash panel, sot that no unfavorable blocks are formed. This is particularly advantageous when the displacement path, which is lengthened by the dash-panel middle are bent angles, for interior components located directly behind it, so that an enlarged displacement path is not available and such interior components are directly dismantled by the cutting and separating edge to thereby prevent block formation in response to a head-on collision. This arrangement is particularly suitable for interior components, such as an air-conditioning/heating unit, which is essentially manufactured from plastic parts that can be easily dismantled by the cutting and separating edge.

For ease of manufacturing and attachment to usual, locally existing structures, this middle area may have an approximately linear intermediate-member part, which extends parallel to, and is rearwardly offset from the aligned side areas of the dash panel, the transitions being designable, using relatively tight curves.

According to one example embodiment of the present invention the dash panel is a hollow girder having a box-shaped section and/or a circular section in the two side areas, and a triangular wedge section in a middle area. In this context, the dash panel can be mounted in the body so that the wedge edge of the wedge-shaped cross-section is pointing forward in the direction of travel. In order to prevent block formation, vehicle parts mounted in front of the dash panel, particularly an air-conditioning/heating unit, are consequently dismantled by a wedge edge acting as a cutting and separating edge, in response to a front-end vehicle collision and displacement of the vehicle parts.

This effect may be used in the case of a dash panel, which runs in a straight line overall and serves as a traverse. However, a middle area is bent at angles, as opposed to the linearly aligned side areas. The dash panel is mountable so that the middle area bent at angles points backwards into the passenger compartment. Consequently, the free displacement path for vehicle parts in front of the dash panel can be enlarged and/or the space in front of the dash panel, which is enlarged by the section bent at angles, can be used for installing vehicle parts that can be dismantled by the wedge-shaped cross-section in response to a head-on collision.

The lateral end areas of the dash panel may be formed as flat box sections which, on one hand, provide a large surface on the longer box-section side for connection to the A-pillars and also allow a high rigidity to be attained.

In another example specific embodiment, the dash panel is manufactured in one piece, as a part formed at a high inner pressure, having continuous transitions between the various profile structures. This results in a correspondingly favorable, continuous transfer of force in the dash panel. In addition, it can be manufactured inexpensively.

In a further example embodiment, end-mounting flanges are proposed for attaching a dash panel, which enable it to be rigidly connected to the A-pillars. With this mounting technique, dash panels may be used as shared components for different vehicle bodies, whereby correspondingly different mounting-flange parts are to be provided as adapter parts, particularly for accommodating different widths.

DETAILED DESCRIPTION

Figure 1:
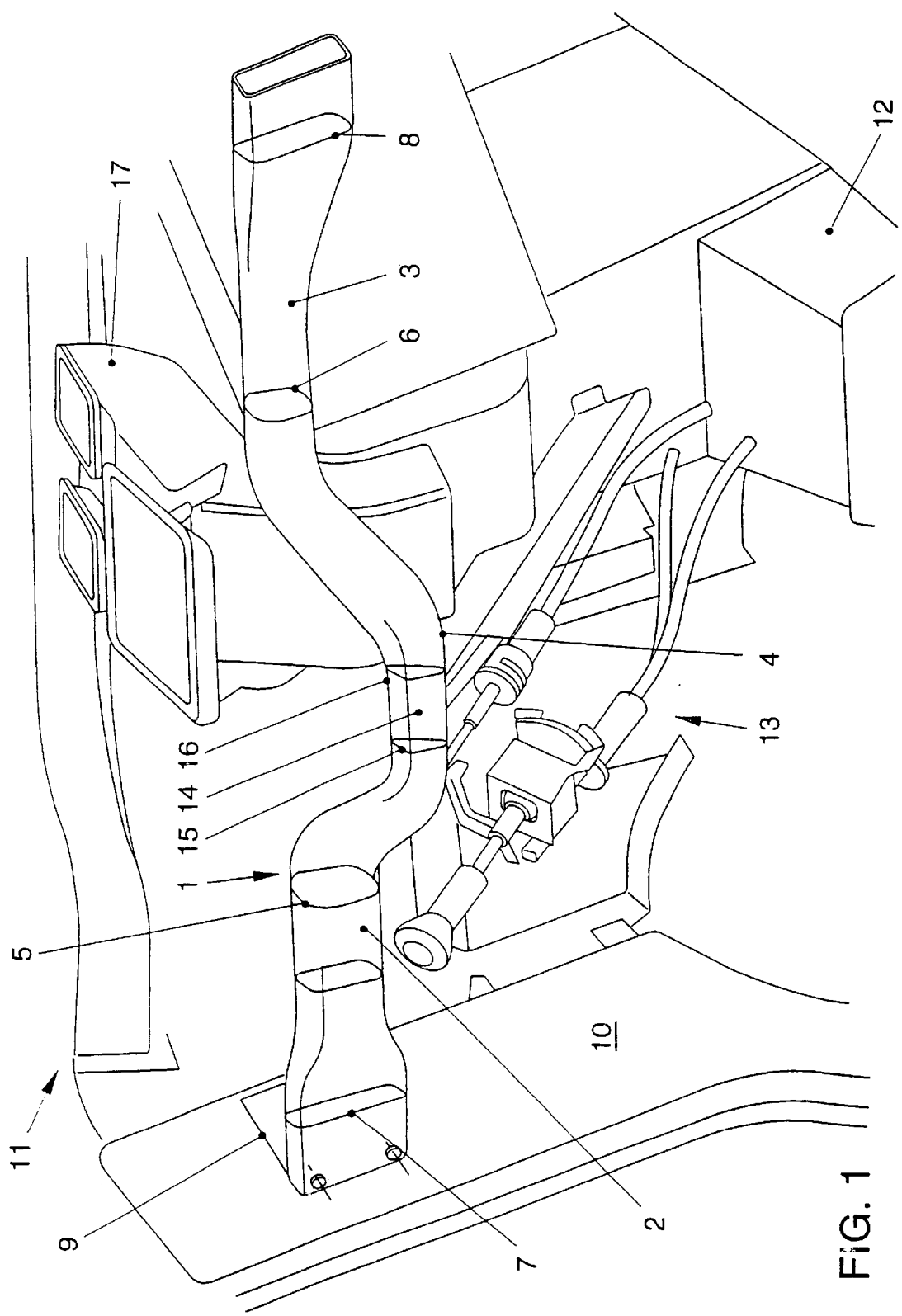
FIG. 1 is a perspective view of a dash panel arrangement in a vehicle body in accordance with the present invention.

A dash panel 1 having side areas 2,3 and a middle area 4 bent back at an angle into the passenger compartment is illustrated in FIG. 1. Side areas 2,3 having a box-shaped cross-section 5,6 have a more rectangular box-shaped cross-section 7,8 in their end areas, and are connected to A-pillars 10 of vehicle body 11, by mounting-flange parts 9 that are shown for clarity only on the left side. A transmission tunnel 12 and a gearshift lever 13 are shown only for the purpose of illustrating the position of dash panel 1 inside vehicle body 11. Middle area 4 of dash panel 1 has an approximately linear, intermediate-member part 14, which has a triangular cross-section 15 whose wedge edge 16 is pointed forward in the direction of travel. Mounted in the middle area in front of dash panel 1 is an air-conditioning/heating unit 17, which is displaced across the existing space, in the direction of wedge edge 16 of dash panel 1, in response to a head-on collision, together with a deformation of the front end.

Figure 2:
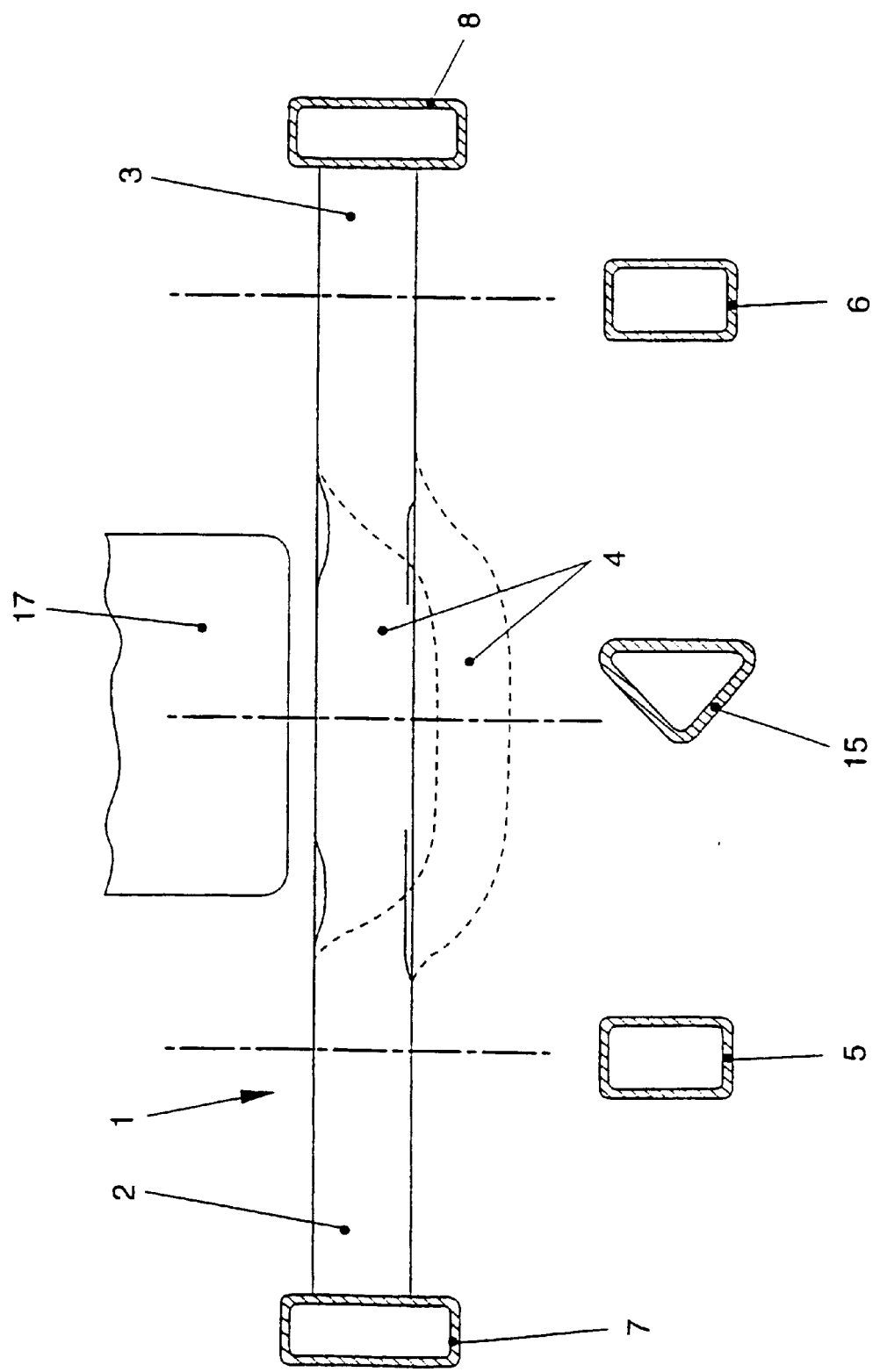
FIG. 2 is a top plan view of a dash panel according to the present invention along with cross-sectional views thereof.

FIG. 2 displays both a straight-line design of dash panel 1 and a design, which is drawn with a dashed line, is bent back at angles, and has a larger space between itself and an air-conditioning/heating unit 17 mounted in front of the dash panel. Dash panel 1 has a triangular cross-section 15 in middle area 4, while side areas 2,3 have box-shaped cross-sections 5,6, which change into flat, box-shaped cross-sections in the end areas.

Dash panel 1 having middle triangular cross-section 15, which acts as a cutting and separating edge, dismantles and cuts through air-conditioning/heating unit 17 in response to a front-end collision, when it is displaced against dash panel 1 due to a deformation of the front end.

What is claimed is:

1. An arrangement of a dash panel in a vehicle body, the vehicle body including laterally opposed A-pillars, a dashboard and at least one vehicle part, the dash panel comprising:
    ends attached to the A-pillars, the dash panel defining a traverse at a height of the dashboard;
    two side areas extending approximately in a straight line and aligned between the A-pillars;
    a middle area disposed between the two side areas and being bent back at angles into a passenger compartment of the vehicle body, the at least one vehicle part being mounted in front of the middle area of the dash panel and being displaceable against the dash panel by an energy-absorbing deformation of a front end of the vehicle in response to a front-end collision, the middle area including a wedge section having a wedge edge pointing forward in a direction of travel of the vehicle body, the wedge edge defining a cutting and separating edge extending in the transverse direction.

2. The arrangement according to claim 1, wherein the at least one vehicle part includes a heating unit.

3. The arrangement according to claim 1, wherein the wedge section includes a triangular section.

4. The arrangement according to claim 1, wherein the middle area includes an approximately linear intermediate-member part that extends parallel to and is rearwardly offset from the aligned side areas.

5. A dash panel for a vehicle body, comprising:
    a hollow girder having two side areas and a middle area disposed between the two side areas, each of the two side areas having at least one of a box-shaped cross-section and a circular cross-section, the middle area having a triangular cross-section defining a wedge profile having a wedge edge, the dash panel being configured to be mounted in the vehicle body so that the wedge edge points forward in a direction of travel of the vehicle body.

6. The dash panel according to claim 5, wherein the two side areas are linearly aligned and the middle area is bent at angles relative to the side areas, the dash panel being configured to be mounted in the vehicle body so that the middle area points backwardly into a passenger compartment of the vehicle body.

7. The dash panel according to claim 6, wherein the middle area includes a straight intermediate-member part that extends parallel to the aligned side areas.

8. The dash panel according to claim 5, further comprising lateral end areas, each of the lateral end areas having a flax, box-shaped cross-section.

9. The dash panel according to claim 5, wherein the side areas and the middle areas are integral, the dash panel including continuous transitions between adjacent cross-sections.

10. The dash panel according to claim 9, wherein the dash panel is formed under a high inner pressure.

11. The dash panel according to claim 5, further comprising end-mounting flanges, the end-mounting flanges defining adapter parts configured to adapt a width of the dash panel to the vehicle body.

* * * * *